Sept. 16, 1941.  P. C. AXTELL  2,256,039
SELF-LIFTING PLOW
Filed May 16, 1940  3 Sheets-Sheet 1
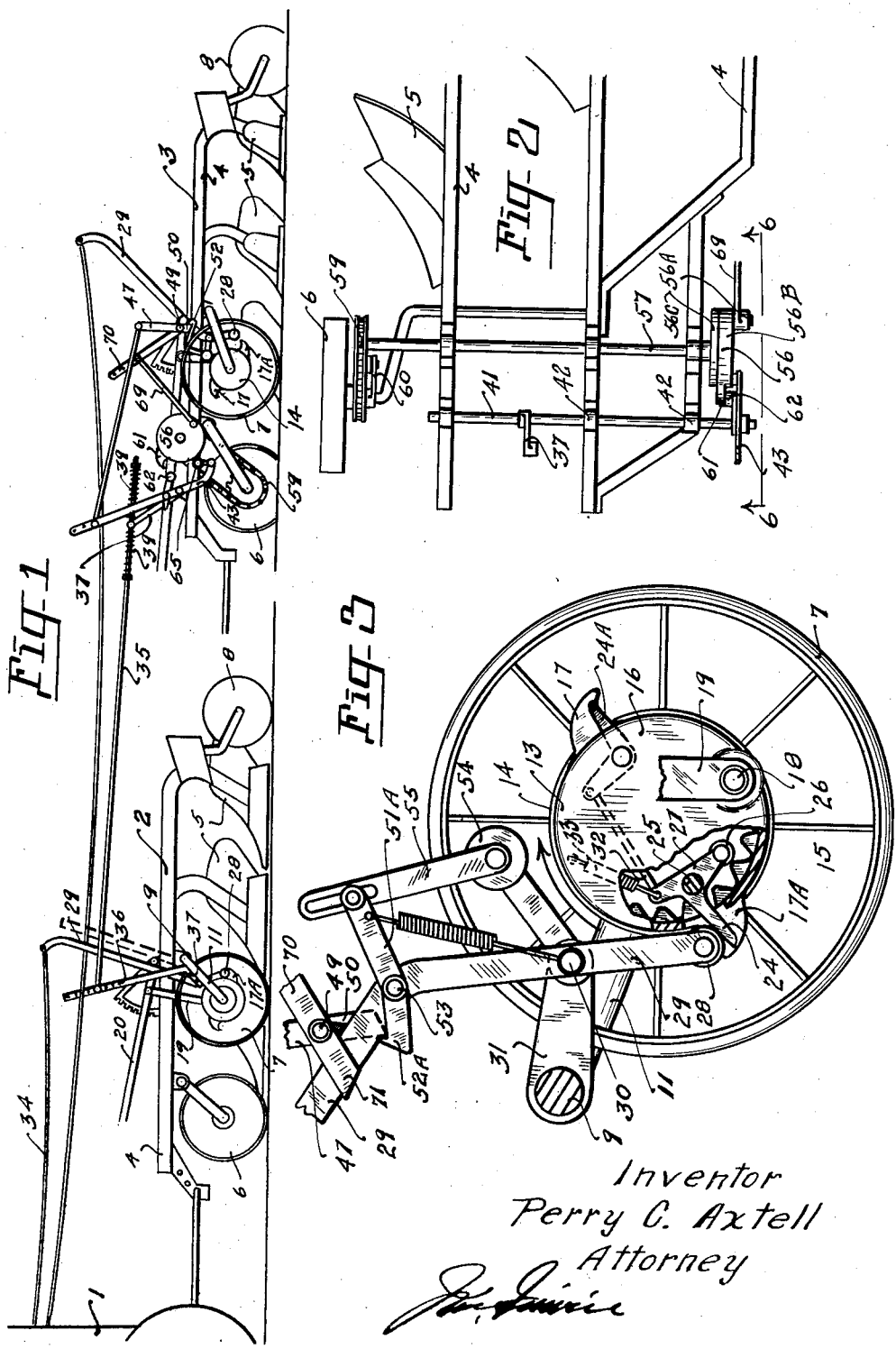
Inventor
Perry C. Axtell
Attorney

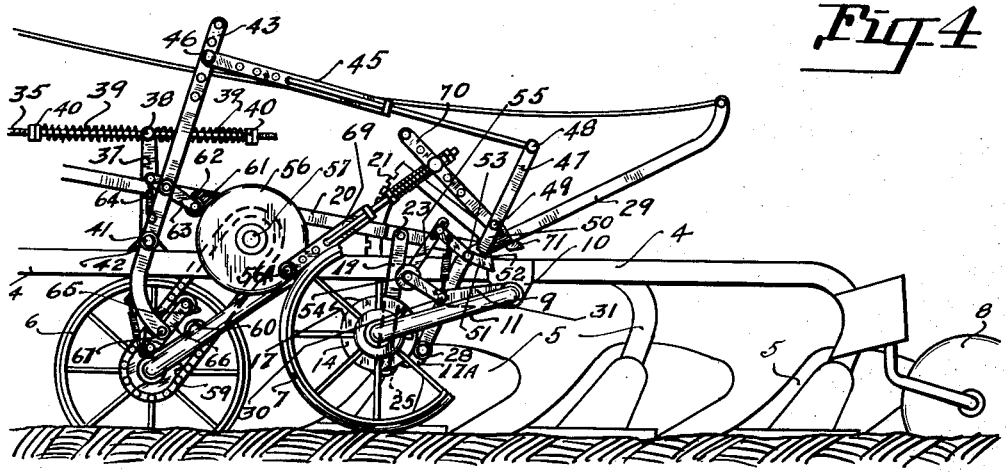
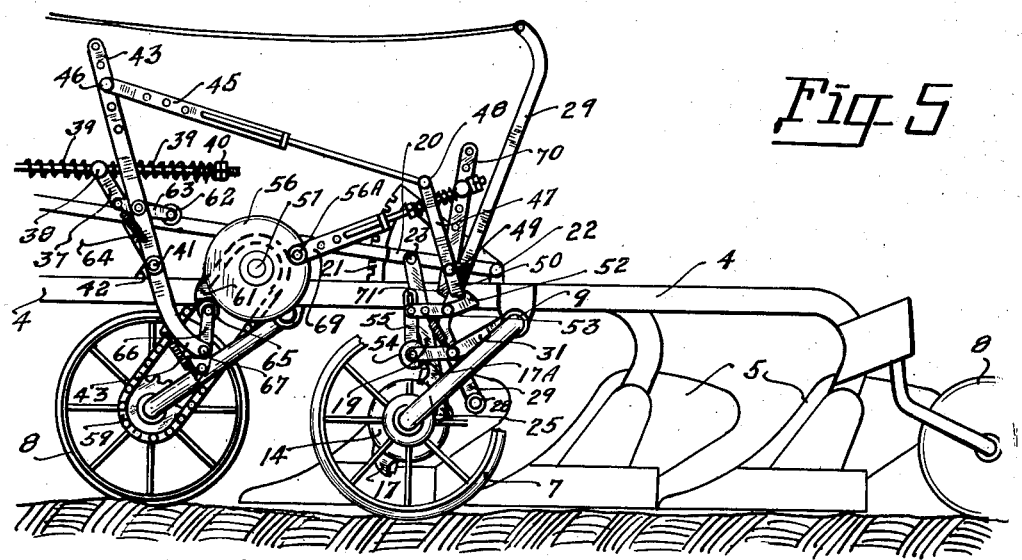
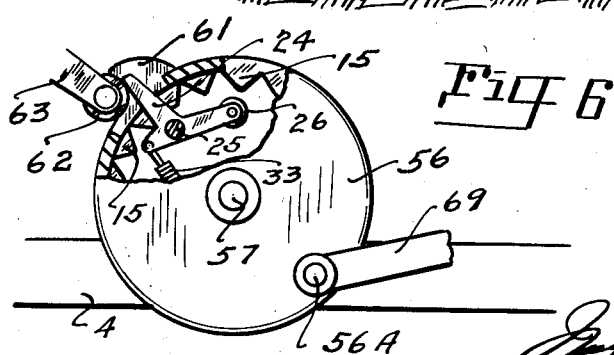

Sept. 16, 1941.  P. C. AXTELL  2,256,039
SELF-LIFTING PLOW
Filed May 16, 1940  3 Sheets-Sheet 3
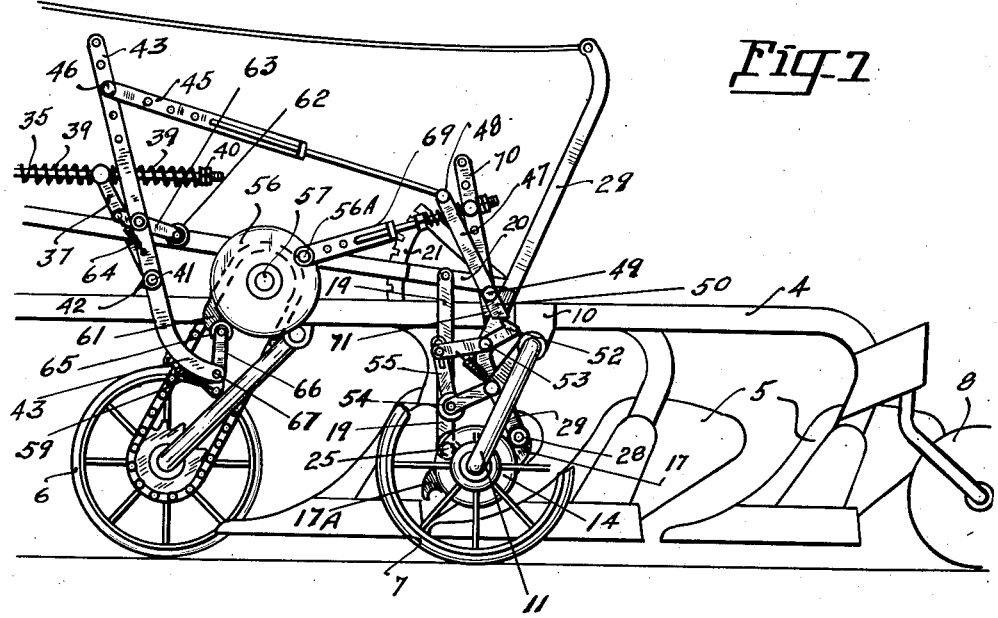
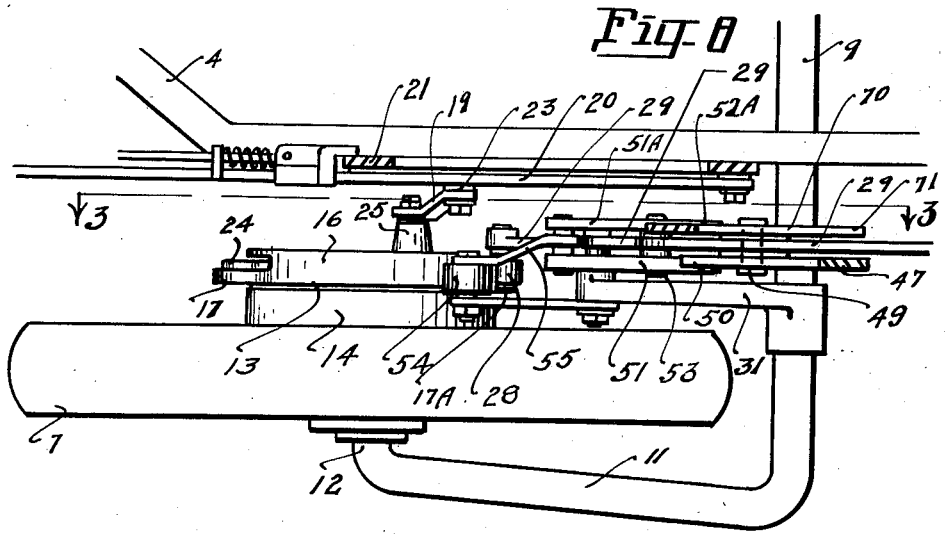
Inventor
Perry C. Axtell
Attorney Patented Sept. 16, 1941

2,256,039

UNITED STATES PATENT OFFICE 2,256,039

SELF-LIFTING PLOW

Perry C. Axtell, Moro, Oreg.

Application May 16, 1940, Serial No. 335,625

12 Claims. (Cl. 97—72)

My invention relates to self-lifting plows and the primary object of the invention is to provide means for automatically lifting or lowering tractor plows, controlled by the operator of the leading plow.

In the past it has been the custom of the tractor operator to pull a trip cord for each plow, this in actual operation is difficult to perform, because the driver of the tractor is busy operating the tractor.

In my new and improved lifting mechanism, it is only necessary for the operator of the tractor to control the operation of the leading plow by a trip cord, from there on the following plows will be automatically raised and lowered by the first or leading plow, leaving the operator of the tractor free to make the proper turns and to control the tractor with ease without having his attention distracted by the operation of all of the plows.

These and other incidental objects will be apparent in the drawings, specification and claims to follow.

Referring to the drawings:

Figure 1 is a diagrammatical drawing of my invention adapted to regular gang plows connected to the rear of a tractor, many parts left out for convenience of illustration and the drawing is intended only as a diagrammatical illustration of connections relative to my invention.

Figure 2 is a fragmentary plan view of the forward end of the rear plow of Figure 1, parts left out for convenience of illustration.

Figure 3 is a side view of part of the raising and lowering mechanism as connected to the lifting wheel of the plow, taken on line 3—3 of Figure 8, looking in the direction indicated, parts broken away for convenience of illustration.

Figure 4 is a side view of my new and improved lifting mechanism, attached to a plow, the plow being shown in lowered position, parts of the plow are left out for convenience of illustration.

Figure 5 is the same view as Figure 4, showing the plow in the process of being raised by the lifting mechanism.

Figure 6 is a detail fragmentary view of the clutch mechanism used in my control lever mechanisms, taken on line 6—6 of Figure 2, looking in the direction indicated, parts broken away for convenience of illustration.

Figure 7 shows the plow in raised position and the relative position of the control and raising mechanisms.

Figure 8 is an enlarged fragmentary plan view of the raising wheel, raising mechanism and control levers.

In the drawings:

Figure 1 of the drawings illustrates the rear end of a tractor 1, having its draw bar connected to a self-lifting plow 2. In this figure the hitch mechanism for towing the second plow 3 is not shown in order to simplify the drawings. In my drawings I illustrate two self-lifting plows, but there may be any number of plows in tandem.

I have illustrated the usual standard types of self-lifting plows for adapting my invention thereon. I will first describe the general construction of these plows, without any reference to the parts of my invention. The frames of the plows are indicated by numerals 4 and 4A, these frames are supported by the usual three wheels, first the leading wheels 6 and 6A, the side or lifting wheels 7 and 7A and the rear caster wheels 8 and 8A. In plows of this type cross shafts 9 and 9A are journaled within suitable bearings 10 and 10A. One of the ends of the cross shafts 9 and 9A are bent at right angles forming crank arms 11 and 11A. The outer ends of the arms 11 are again bent at right angles providing stub shafts 12 and 12A. The wheels 7 and 7A are journaled to the stub shafts 12 and 12A. These wheels are for the purpose of raising and lowering the plows, as well as for supporting the plows at a predetermined height. The wheels 7 and 7A have clutch assemblies 13 and 13A located within their hubs for the purpose of raising and lowering the plows.

I will now describe the operation of these clutch assemblies. Drums 14 and 14A are fixedly secured to the wheels 7 and 7A and have corrugated teeth 15 therein and integral therewith. In this description I am only going to describe the mechanism contained within one of the clutch mechanism using a single set of reference numerals to describe the same. In the clutch assembly a secondary drum 16 is journaled within the drums 14 and to the stub shaft 12. The drum 16 is prevented from revolving with the wheels by the stops 17 and 17A, these stops engage with a stop cam, to be more fully described later. A stub shaft 18 is fixedly mounted to the drum 16, a link 19 is pivotally connected to this stub shaft at its one end, having its opposite end pivotally connected to a lever 20 at 23, the lever 20 is pivotally mounted to the quadrant 21 at 22 and is manually positioned relative to the quadrant to any desired adjustment, regulating the depth of the plows.

Referring to Figures 3 and 4, when the drum 16 is held in the position shown by the stop 17A contacting the stop cam 28, the plow will be in lowered or plowing position, the stub shaft 18 will be at its lowest position relative to the drum 16, thereby allowing the link 19 to lower the frame of the plow.

Referring now to Figure 7, the stop 17 is contacting the stop cam 28 in this position, the stub shaft 18 is in its raised or highest position relative to the drum 16, thereby raising the link 19 to its upper position and in so doing the frame of the plow is raised relative to the ground surface, the height of the plow frame being determined by the position of the lever 20.

The clutch mechanism consists of the following parts. Referring to Figure 3, a stub shaft 25 is fixedly mounted to the drum 16. A bell crank 24 is pivotally mounted to the stub shaft 25 and has a cam 26 journaled to the end of the arm 27, the cam 26 is adapted to engage the corrugated teeth 15 within the inner periphery of the drum 14. When this engagement takes place the drum 14, which is secured to the wheel 7, is locked relative to the secondary drum 16, so that as the wheel turns the drum 16 will be revolved raising and lowering the link 19, as heretofore described. A stop cam 28 is provided for operating the bell crank 24 and for holding the drum 16 in a predetermined position. This stop cam is located on the lower end of the trip lever 29. The trip lever 29 is pivotally mounted at 30 to a stationary arm 31, the arm 31 is fixedly mounted to the shaft 9 and maintains a fixed relationship to the arm 11 and the wheel and clutch assembly.

I will now describe a cycle of operation relative to the clutch assembly in raising or lowering the plows. Referring to Figure 3, by pulling the lever 29 to the right relative to the drawings, about its pivot point 30 on the arm 31, the cam 28 on its lower end will be disengaged from the stop 17A permitting the drum 16 to rotate with the wheel 7, when the following action takes place.

When the cam 28 was disengaged from the stop 17A it was also disengaged from the bell crank arm 24, permitting the spring 33 to pivot the bell crank about the stub shaft 25 together with the arm 27 of the bell crank bringing the cam 26 into engagement with the corrugated teeth 15 within the drum 14 of the wheel 7. When this is accomplished the cam 26 will force the arm 27 and the stub shaft 25 to rotate with the drum 14, and as the stub shaft 25 is fixedly mounted on the inner surface of the drum 16, the drum 16 will be revolved with the wheel 7 raising the link 19 upwardly, as the stub shaft 18 is revolved to its upper position, shown in Figure 7, the trip lever 29 was only momentarily rocked about its pivot 30 just a sufficient length of time to disengage the cam 28 from the stop 17A and the bell crank 24, as the drums revolve the lever 29 is allowed to return to its original position bringing the stop cam 28 in line with the stop 17, which is moving towards the stop 28 as the wheel 7 revolves.

When the stop 17 is about to contact the stop cam 28, the cam 28 first rocks the bell crank 24A sufficiently about its stub shaft 24B to disengage the cam 26 from the corrugated teeth 15 as follows. A link 32 connects the arm 24C of the bell crank 24A to the bell crank arm 27 of the bell crank 24 so that when the stop 28 contacts the arm 24A the connecting link 32 will operate the bell crank 24 releasing the cam 26 from the teeth 15, disengaging the clutch. The stop 17, which is part of the drum 16, will hold the drum 16 in this position against the stop cam 28 until the lever 29 is again manipulated about its pivot point 30, disengaging the cam 28 from the stop 17 and the bell crank 24A, allowing the cam 26 to engage the teeth 15. When this is done the drum 16 will revolve the stub shaft 18 to its lower position, as shown in Figure 3, lowering the plow to plowing position, and as the stop 17A approaches the stop cam 28 the bell crank 24 will release the cam 26 from the teeth 15 and the stop 17A will again prevent the drum 16 from further rotation until the lever 29 is again manipulated. The above description of mechanism relative to the clutch assembly and plowing is of well known practice, heretofore the lever 29 has been operated by a pull cord 24 from the tractor 1, several pull cords being required. In my invention I still maintain this principle of operating on the lever 29A of the leading plow 2.

I will now describe the several parts of my invention as adapted to controlling the operation of the lever 29 automatically on the plow 3. A rigid arm 36 is fixedly secured at 37 to the right angle arm 11A of the shaft 9A on the leading plow 2 and revolves therewith when the arm 11A is raised or lowered by the clutch mechanism above described. When the plow 2 is raised the lever 36 is rocked forward with and by the shaft 9A on the arm 11A. A connecting link 35 is pivotally mounted at 35A on the upper end of the lever 36, the opposite end of the connecting link 35 is connected to the upper end of the lever 37, located on the forward end of the plow 3. The link 35 has a floating mechanism relative to the lever 37, this is accomplished by passing the link through a fitting 38 having springs 39 contacting the fitting 38 and adjusting nuts 40 on the link 35. This provides means for compensating for variations in distance between the plows.

The lever 37 is mounted to the shaft 41, said shaft 41 is journaled to the frame of the plow 3 by suitable bearings 42. A lever 43 is fixedly mounted to the shaft 41, and connected to this lever is an adjustable connecting link 45, this link is connected at 46 to the lever 43 at its one end and to the lever 47 at 48 at its opposite end. The lever 47 is pivotally connected to the lever 29 at 49. This lever extends past the pivotal point 49 at 50 and engages the latch 51 at 52, the latch 51 is pivotally mounted to the lever 29 at 53. When the end 50 of the lever 47 is engaged with the latch 51 the lever 47 is then rigidly connected to the lever 29 so that by operating the lever 37 the lever 29 will be operated therewith.

I will now describe the operation of the above lever assembly. Instead of the operator of the tractor having to manually trip the lever 29 by the pull cord 34A, the arm 36, secured to the plow 2, will operate the lever 29 in the following manner. The operator of the tractor will operate the lever 29A of the leading plow 2 by the pull cord 34, this will operate the clutch mechanism within the wheel 7A raising the plow 2 out of the ground, rocking the lever 36 forward pulling the link 35 therewith, which will also rock the lever 37 forward revolving the shaft 41, bringing the lever 43 forward pulling the link 45 therewith and pulling the lever 47 together with the trip lever 29 forward about the pivot 30 of the trip lever 29, thereby disengaging the stop cam 28 from the stop 17A and bell crank 24, thereby engaging the clutch assembly as heretofore described, raising the plow 3 out of the ground.

As stated before, as soon as the stop cam 28 has been disengaged from the stop 17A and the clutch assembly begins to revolve the stop cam 28 must register with the stop 17 coming up to engage the same. When the lever 29A is manually operated, the operator simply releases the cord allowing the lever 29A to pivot back to its starting or normal position, this has to be done automatically in the case of the lever 29 employed on the plow 3 and is done in the following manner.

As the stop 17A rotates in the direction of the arrow, Figure 3, it will contact the roller 54, which in turn will raise the link 55 pivoting the latch 51 about its pivot point 53, the lever 51 is best shown in Figures 4, 5 and 7 and 8. This will unlatch the end 50 of the lever 47 allowing the lever 29 to be released from the lever 47 bringing the stop cam 28 in line with the stop 17 and the bell crank 24A disengaging the cam 26 from the teeth 15 within the clutch assembly as heretofore fully described.

In the operation of the clutch system within the wheel 7, the lever 29 should be operated sufficient time only to disengage the stop cam 28 from either of the stops 17 or 17A, permitting them to pass under the stop cam 28. The lever 29 then returns to its starting position, bringing the stop cam 28 in line with either the stop 17 or 17A. When the lever 29 is operated manually, as is ordinarily the case, the operator simply trips the lever and immediately releases the same, but due to the fact that the lever 29 controlling the plow 3 is operated by the link 35, which remains in a forward position while the leading plow is in raised position, a releasing mechanism must be provided for the lever 29, as described above, namely the roller 54, link 55 and latch 51, which engages and disengages the lever 29 from the lever 70.

I have taken my invention through a cycle of operation for controlling the raising of the plows 2 and 3. When the above raising operation took place the following operations were also taking place. In order to lower the plow 3 a special clutch mechanism 56, similar to the one just described within the raising wheel 7, is provided and mounted to the shaft 57, shaft 57 is journaled to the frame of the plow by suitable bearings 58, and is continuously driven by a chain 59 from the wheel 6. An automatic tightener pulley 60 is provided for keeping the chain 59 in correct operation tension when the wheel 6 is adjusted to different positions.

The clutch assembly 56 consists of a drum 56C, drum 56C is keyed to the shaft 57 and revolves therewith when the plows are moving. A floating or outer drum 56B is journaled to the shaft 57 and rotates only when the clutch assembly has been locked in the following manner. A stop 61 is formed integral with the drum 56B and contacts the stop cam 62, preventing the drum 56B from revolving when the clutch is out of engagement. The clutch assembly consists of a bell crank 24A, pivotally mounted to the stub shaft 25A. The stub shaft 25A is fixedly secured to the drum 56B, in Figure 6 the clutch mechanism is shown disengaged. The cam wheel 26A is journaled to the arm 27A of the bell crank 24A and engages with the teeth 15A. When the stop cam 62 is removed from in front of the bell crank 24A and the stop 61, the cam roller 26A will engage the teeth 15A of the drum 56A, thereby revolving the drum 56B with the drum 56A. The stop cam 62 is journaled to the end of the arm 63, which is pivotally mounted to the lever 43 at 63A. The stop cam 62 is held against the clutch assembly by the lever 43 and spring 64.

When the connecting link 35 was pulled forward by the lever 36 of the forward plow 2 in the raising operation, it pulled the lever 37 of the plow 3 forward rotating the shaft 51 therewith. Fixedly secured to the end of the shaft 41 is the lever 43 to which the stop cam 62 is mounted, as heretofore described, when the link 35 is pulled forward the lever 43 disengages the cam 62 from the bell crank 24A and the stop 61, allowing the clutch mechanism to interlock.

A second stop cam 65 is journaled to the end of the pivotally mounted arm 66, which is located below the shaft 41 on the lever 43 and as the lever 43 is pulled forward by the link 35 releasing the stop cam 62 from the clutch assembly the stop cam 65 is brought into contact, as shown in Figure 5, with the bell crank 24A and the stop 61 releasing the clutch assembly and holding the same as shown in Figure 5.

A link 69 has one of its ends journaled to a crank pin 56A and its opposite end pivotally mounted to the lever 70. The crank pin 56A is fixedly mounted to the drum 56B and revolves therewith. The lever 70 is pivotally mounted to the pivot bearing 49, which is fixedly mounted to the lever 29. When the clutch assembly 56 was released from the stop cam 62, shown in Figure 4, and revolved to the position shown in Figure 5, against the stop cam 65 the link 69 forced the lever 70 to the right above its pivot bearing 49, bringing its lower end 71 behind the notch 52A of the latch 51A, best shown in Figures 3, 7 and 8.

Both of the trip levers 47 and 70 that are used for operating the lever 29 and disengaging the stop 28 from the clutch stops 17 and 17A are pivotally mounted at 49. These levers are locked by two separate locking arms 51 and 51A, which are pivotally mounted at 53 on either side of the lever 29. These locking levers or latches are actuated by the link 55 from the roller 56 which is contacted by the stop arms 17 and 17A.

I will now describe the lowering of the plows. When the rope 34 is again operated by the tractor driver and the lever 29A is pulled forward on the leading plow 2, the stop 17 will be released from the stop cam 28, permitting the clutch assembly to lower the link 19. This allows the arm 11 of the shaft 9 to rock to the right, as shown in dotted position in Figure 1, forcing the link 35 to the right together with the lever 37 rotating the shaft 41 and lever 43 to the right, disengaging the cam stop 65 from the bell crank 24A and stop 61 of the clutch mechanism 56. The clutch will then be engaged pulling the link 69 and the lever 70 to the left or forward, which will pull the lever 29 forward by the action of the latch 51A, holding the end 71 of the lever 70 therebehind. When the lever 29 of plow 53 is pulled forward the stop cam 28 will release the stop 17 allowing the bell crank 24A to engage the cam 26 within the teeth 15 of the clutch 13 rotating the spindle 18 to the lowered position, indicated in Figures 3 and 4. The stop 61 rotates to the position shown in Figure 4 and again engages the stop cam 62 holding the clutch 56 out of engagement. Simultaneous therewith the stop 17 of the clutch 13 will have actuated the cam wheel 54, raising the link 55 unlatching the latch 51A from the end 71 of the lever 70 so that the lever 29 will be permitted to rock backward bringing the stop cam 28 in line with the stop 17A and bell crank 24 for disengaging the clutch and allowing the plow to remain in lowered position until the next cycle of operation is ready to be performed, which was described on the raising of the plow mechanism heretofore.

I do not wish to be limited to the particular mechanical construction described, as other forms of embodiment may be employed, still coming within the scope of the claims to follow.

What I claim as new is:

1. In a tractor-drawn series of plows wherein each plow is provided with means for raising and lowering the plow shares relative to the surface being operated on, means for manually operating the raising and lowering mechanism of the leading plow from the tractor or power operator, means for controlling the raising and lowering mechanism of the following plow, and means automatically operated by the raising and lowering mechanism of the leading plow to compelling actuation of the controlling means of the following plows to produce an operating condition of the following plow in accordance with the operating condition of the leading plow.

2. A construction as defined in claim 1 wherein the controlling means of the following plow includes an element for governing the raising and lowering mechanism of each plow following the leading plow, means for locking the element against movement when free of manual operation for the raising or lowering of the leading plow, and driven means operated in the movement of the following plow for actuating the element when released.

3. A construction as defined in claim 1 wherein the normal raising and lowering mechanism of the following plow includes a lock for holding the following plow in raised position, an element actuated during the travel of the following plow to release the lock and permit the following plow to be lowered, a clutch on each following plow for controlling the movement of the element, power means controlled by the movement of the following plow to actuate the clutch, and means controlled by the manual operation of the leading plow to inaugurate operation of the clutch.

4. A construction as defined in claim 1 wherein the means for raising and lowering the plow includes a clutch mechanism including a part controlled by the ground wheel of the plow and a cooperating free moving part, a dog for coupling the parts of the clutch together, a lever for controlling the dog and preventing coupling of the clutch parts, means for operating the lever to permit the dog to lock the clutch parts together, and an element on the normally free clutch part to raise or lower the plow in accordance with the position of that clutch part.

5. In a tractor-drawn series of plows, clutch mechanism including a part driven in the movement of the plow and a normally free part, a dog for coupling the parts of the clutch together, a crank shaft carried by the frame of the plow and connected to the driven clutch part, projections on the fixed clutch part to limit the position of such part in the movement of the plow, a lever cooperating with the clutch, means for moving the lever out of the path of the engaged projection to permit interlocking of the clutch parts to cause the normally free clutch part to move in the movement of the plow, and a bar connected to the movable clutch part and to the frame of the plow to elevate the frame and thereby the plow shares in the movement of the normally free part of the clutch.

6. In a tractor-drawn series of plows, clutch mechanism including a part driven in the movement of the plow and a normally free part, a dog for coupling the parts of the clutch together, a crank shaft carried by the frame of the plow and connected to the driven clutch part, projections on the fixed clutch part to limit the position of such part in the movement of the plow, a lever cooperating with the clutch, means for moving the lever out of the path of the engaged projection to permit interlocking of the clutch parts to cause the normally free clutch part to move in the movement of the plow, and a bar connected to the movable clutch part and to the frame of the plow to elevate the frame and thereby the plow shares in the movement of the normally free part of the clutch, a second clutch element having a plow-driven part and a normally free part, coupling means for the said part of the second clutch element, a lever for controlling the coupling of the second parts of the clutch element, means operated in the control of the leading plow to move the lever to permit coupling of the second clutch parts, and an arm on the normally free member of the second clutch element to release the holding means of the following plow to the influence of gravity.

7. A construction as defined in claim 6 wherein the means for operating the coupled clutch elements of the second clutch part are driven by a ground engaging element of the plow.

8. A construction as defined in claim 6 wherein the lever for controlling the clutching of the second clutch parts is mounted upon a shaft, and means operated in the manual operation of the leading plow to operate the shaft and thereby the lever.

9. A construction as defined in claim 6 including a locking means for holding the following plows elevated, a lever means for tripping the locking, and a variable connection for releasing the locking means in the corresponding manual relation of the plow shares of the leading plow.

10. A construction as defined in claim 6 wherein the driven member of the second clutch part carries a series of teeth, and the normally free member of the second clutch part includes a dog to engage said teeth to lock the clutch parts together, a projection on the continuously driven member of the second clutch part, a lever having spaced elements to cooperate with the said projection in the different positions of the latter, a shaft on which the lever is mounted, and means actuated in the movement of the cooperating part of the leading plow to turn the shaft.

11. A construction as defined in claim 6 wherein the driven member of the second clutch part carries a series of teeth, and the normally free member of the second clutch part includes a dog to engage said teeth to lock the clutch parts together, a projection on the continuously driven member of the second clutch part, a lever having spaced elements to cooperate with the said projection in the different positions of the latter, a shaft on which the lever is mounted, and means actuated in the movement of the cooperating part of the leading plow to turn the shaft, said means having a lost motion connection with the shaft.

12. A construction as defined in claim 6 wherein the driven member of the second clutch part carries a series of teeth, and the normally free member of the second clutch part includes a dog to engage said teeth to lock the clutch parts together, a projection on the continuously driven member of the second clutch part, a lever having spaced elements to cooperate with the said projection in the different positions of the latter, a shaft on which the lever is mounted, and means actuated in the movement of the cooperating part of the leading plow to turn the shaft, a projection on the elevating mechanism of the leading plow and a rod leading from said projection and having lost motion connection with the shaft.

PERRY C. AXTELL.